US008428996B2

(12) United States Patent
Grove et al.

(10) Patent No.: US 8,428,996 B2
(45) Date of Patent: Apr. 23, 2013

(54) METHOD AND SYSTEM AUTOMATICALLY TO SUPPORT MULTIPLE TRANSACTION TYPES, AND TO DISPLAY SELLER-SPECIFIC TRANSACTIONS OF VARIOUS TRANSACTION TYPES IN AN INTEGRATED, COMMINGLED LISTING

(75) Inventors: Steve Grove, San Jose, CA (US); Steve Yan, Fremont, CA (US); Rashid Aidun, San Jose, CA (US); Premendra Singh, San Jose, CA (US); S. N. Rajesh, Los Altos Hills, CA (US); Preeti Somani, San Jose, CA (US); Kevin Cooney, Scotts Valley, CA (US)

(73) Assignee: eBay Inc., San Jose, CA (US)

( * ) Notice: Subject to any disclaimer, the term of this patent is extended or adjusted under 35 U.S.C. 154(b) by 1426 days.

(21) Appl. No.: 10/023,583

(22) Filed: Dec. 14, 2001

(65) Prior Publication Data
US 2002/0188551 A1 Dec. 12, 2002

Related U.S. Application Data

(60) Provisional application No. 60/297,665, filed on Jun. 11, 2001.

(51) Int. Cl.
*G06Q 40/00* (2006.01)
(52) U.S. Cl.
USPC ............. 705/7.29; 705/26.44; 705/44; 705/5; 705/37; 705/36 R
(58) Field of Classification Search ............... 705/26, 705/27, 5, 44, 35–40, 36 R
See application file for complete search history.

(56) References Cited

U.S. PATENT DOCUMENTS

| 3,573,747 | A | 4/1971 | Adams et al. |
| 3,581,072 | A | 5/1971 | Nymeyer |
| 4,412,287 | A | 10/1983 | Braddock, III |
| 4,674,044 | A | 6/1987 | Kalmus et al. |
| 4,677,552 | A | 6/1987 | Sibley, Jr. |
| 4,789,928 | A | 12/1988 | Fujisaki |
| 4,799,156 | A | 1/1989 | Shavit et al. |
| 4,823,265 | A | 4/1989 | Nelson |
| 4,864,516 | A | 9/1989 | Gaither et al. |

(Continued)

FOREIGN PATENT DOCUMENTS

| CA | 2253543 | 3/1997 |
| FR | 2658635 A1 | 2/1991 |

(Continued)

OTHER PUBLICATIONS

Chinese Application Serial No. 02811759.X, Office Action mailed Jun. 6, 2008, 5 pgs.

(Continued)

*Primary Examiner* — Charles Kyle
*Assistant Examiner* — Siegfried E Chencinski
(74) *Attorney, Agent, or Firm* — Schwegman Lundberg & Woessner, P.A.

(57) ABSTRACT

This invention provides for a method of (or apparatus for) facilitating the display of items of multiple transaction types in a commingled listing. The display of items of multiple transaction types in a commingled listing may include items which are being offered by a specific Seller at a network based commerce facility.

18 Claims, 15 Drawing Sheets

U.S. PATENT DOCUMENTS

| | | |
|---|---|---|
| 4,903,201 A | 2/1990 | Wagner |
| 5,063,507 A | 11/1991 | Lindsey et al. |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |
| 5,243,515 A | 9/1993 | Lee |
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,305,200 A | 4/1994 | Hartheimer et al. |
| 5,325,297 A | 6/1994 | Bird et al. |
| 5,329,589 A | 7/1994 | Fraser et al. |
| 5,375,055 A | 12/1994 | Togher et al. |
| 5,394,324 A | 2/1995 | Clearwater |
| 5,426,281 A | 6/1995 | Abecassis |
| 5,485,510 A | 1/1996 | Colbert |
| 5,553,145 A | 9/1996 | Micali |
| 5,557,728 A | 9/1996 | Garrett et al. |
| 5,596,944 A | 1/1997 | Massie |
| 5,596,994 A | 1/1997 | Bro |
| 5,598,557 A | 1/1997 | Doner et al. |
| 5,640,569 A | 6/1997 | Miller et al. |
| 5,657,389 A | 8/1997 | Houvener |
| 5,664,115 A | 9/1997 | Fraser |
| 5,666,524 A | 9/1997 | Kunkel et al. |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,722,418 A | 3/1998 | Bro |
| 5,727,165 A | 3/1998 | Ordish et al. |
| 5,771,291 A | 6/1998 | Newton et al. |
| 5,771,380 A | 6/1998 | Tanaka et al. |
| 5,790,790 A | 8/1998 | Smith et al. |
| 5,794,219 A | 8/1998 | Brown |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,872,848 A | 2/1999 | Romney et al. |
| 5,873,069 A | 2/1999 | Reuhl et al. |
| 5,884,056 A | 3/1999 | Steele |
| 5,890,138 A | 3/1999 | Godin et al. |
| 5,905,974 A | 5/1999 | Fraser et al. |
| 5,905,975 A | 5/1999 | Ausubel |
| 5,922,074 A | 7/1999 | Richard et al. |
| 5,924,072 A | 7/1999 | Havens |
| 5,926,794 A | 7/1999 | Fethe |
| 5,974,412 A | 10/1999 | Hazlehurst et al. |
| 5,987,440 A * | 11/1999 | O'Neil et al. ................. 705/44 |
| 5,991,739 A | 11/1999 | Cupps et al. |
| 6,023,683 A | 2/2000 | Johnson et al. |
| 6,035,402 A | 3/2000 | Vaeth et al. |
| 6,044,363 A | 3/2000 | Mori et al. |
| 6,047,264 A | 4/2000 | Fisher et al. |
| 6,055,518 A | 4/2000 | Franklin et al. |
| 6,058,417 A | 5/2000 | Hess et al. |
| 6,061,448 A | 5/2000 | Smith et al. |
| 6,073,117 A | 6/2000 | Oyanagi et al. |
| 6,085,176 A | 7/2000 | Woolston |
| 6,104,815 A | 8/2000 | Alcorn et al. |
| 6,119,137 A | 9/2000 | Smith et al. |
| 6,178,408 B1 | 1/2001 | Copple et al. |
| 6,192,407 B1 | 2/2001 | Smith et al. |
| 6,202,051 B1 | 3/2001 | Woolston |
| 6,243,691 B1 | 6/2001 | Fisher et al. |
| 6,415,320 B1 | 7/2002 | Hess et al. |
| 6,466,918 B1 * | 10/2002 | Spiegel et al. ............... 705/7.29 |
| 6,466,919 B1 * | 10/2002 | Walker et al. ................. 705/37 |
| 6,587,838 B1 * | 7/2003 | Esposito et al. ............. 705/7.29 |
| 6,934,690 B1 * | 8/2005 | Van Horn et al. ............ 705/26.2 |
| 7,212,996 B1 * | 5/2007 | Carnahan .................... 705/36 R |
| 7,373,317 B1 * | 5/2008 | Kopelman et al. ......... 705/26.44 |
| 7,428,505 B1 * | 9/2008 | Levy et al. ..................... 705/37 |
| 2001/0021924 A1 | 9/2001 | Ohno |
| 2002/0026369 A1 | 2/2002 | Miller et al. |
| 2002/0082932 A1 | 6/2002 | Chinnappan et al. |
| 2002/0184059 A1 * | 12/2002 | Offutt et al. ..................... 705/5 |
| 2007/0255702 A1 | 11/2007 | Orme et al. |
| 2008/0046336 A1 | 2/2008 | Mosleh |
| 2010/0306205 A1 | 12/2010 | Sun et al. |

FOREIGN PATENT DOCUMENTS

| | | |
|---|---|---|
| JP | 11-007452 | 1/1999 |
| KR | 2000-54343 | 9/2000 |
| NL | 9300266 | 2/1993 |
| WO | WO 92/15174 | 2/1992 |
| WO | WO95/17711 | 6/1995 |
| WO | WO-96/07149 A1 | 3/1996 |
| WO | WO 96/34356 | 4/1996 |
| WO | WO 97/37315 | 3/1997 |
| WO | WO99/63461 | 12/1999 |
| WO | WO-0025218 A1 | 5/2000 |
| WO | WO-0188796 | 11/2001 |
| WO | WO-02101625 A1 | 12/2002 |
| WO | WO-2010141473 A1 | 12/2010 |

OTHER PUBLICATIONS

Chinese Application Serial No. 02811759.X, First Office Action mailed Apr. 3, 2007, 10 pgs.

"Introduction for online shopping: a shopping on Internet for first time (written in Japanese language)", *Mobile i, Softbank Publishing K.K.*, 6 (6), (Jun. 1, 2000), 109.

Japanese Application Serial No. 2003-504306, Final Office Action mailed Sep. 9, 2008, 5 pgs.

Japanese Application Serial No. 2003-504306, Office Action mailed Jan. 15, 2008, 10 pgs.

Korean Application Serial No. 10-2007-7029722, Office Action mailed Mar. 13, 2008, 16 pgs.

Korean Application Serial No. 2003-7016152 Trial Decision mailed Jul. 8, 2008, 10 pgs.

Jiro, M., et al., "Thorough guide for Net auction: Yahoo! Auction, eBay Japan (written in Japanese language)", *1st Edition, Sotechsha (Publisher)*, (Jun. 1, 2000), 39-41.

Nobuhiro, S., "What site is influential as a portal (Japanese w/translation)", *Nikkei Computer, Nikkei Business Publication Inc. (Publisher)*, 454, (Oct. 12, 1998), 98-99.

Takehiko, O., et al., "How to receive benefits in Auction: Yahoo! Auction—50 hints for sales and auctions", *Ascii Net J, Ascii Corp. (Publisher)*, 5, (Dec. 22, 2000), 2 pgs.

"China Application Serial No. 02811759.X, Office Action mailed on Feb. 27, 2009", 3 pgs.

"Korean Application Serial No. 2007-7029722, Office Action mailed Mar. 7, 2009", 16 pgs.

"Korean Application Serial No. 10-2007-7029722, Supplemental Appeal Brief filed Mar. 19, 2010", 14 pgs.

"Korean Application Serial No. 10-2009-7007814, Final Office Action mailed Mar. 29, 2010" (with English translation), 8 Pgs.

"Chinese Application Serial No. 02811759.X, Office Action mailed Oct. 21, 2009", 10 pgs.

"Korean Application Serial No. 10-2009-7007814, Office Action mailed Jul. 15, 2009", 9 pgs.

"Korean Application Serial No. 2007-7029722, Office Action mailed Jun. 19, 2009", 10 pgs.

"Chinese Application Serial No. 02811759.X, Office Action mailed Jun. 10, 2010", 5 pgs.

"International Application Serial No. PCT/US10/036907, International Search Report and Written Opinion mailed Jul. 28, 2010", 9 pgs.

"International Application Serial No. PCT/US2010/036907 Search Report mailed Jul. 28, 2010", 30 pgs.

"Korean Application Serial No. 10-2009-7007814, Office Action Response Filed Jul. 29, 2010", 13 pgs.
Hammouda, et al., "Efficient Phrase-Based Document Indexing for Web Document Oustering in", IEEE Transactions on Knowledge and Data Engineering, Oct. 2004, vol. 16, No. 10, [Online]. Retrieved from the Internet: <URL: http://watnow.uwaterloo.calpublhammouda/hammouda-ieee-tkde-oct04.pdf>, (Oct. 2004), pp. 1279-1296.
"U.S. Appl. No. 12/475,997, Non Final Office Action mailed Apr. 28, 2011", 11 pgs.
"U.S. Appl. No. 12/475,997, Response filed Jul. 28, 2011 to Non-Final Office Action Received Apr. 28, 2011", 10 pgs.
"European Application Seral No. 02706286.8, Response filed May 10, 2011 to Office Action mailed Aug. 31, 2010", 25 pgs.
"European Application Serial No. 02706286.8, Summons to Attend Oral Proceedings mailed May 25, 2011", 5 pgs.
"Korean Application No. 2007-7029722, Trial Decision dated Mar. 16, 2011", 11 pgs.
"Chinese Application Serial No. 02811759.X, Office Action mailed Dec. 7, 2007", 10 pgs.
"Chinese Application Serial No. 02811759.X, Response filed Feb. 3, 2010", 7 pgs.
"Chinese Application Serial No. 02811759.X, Response filed Feb. 16, 2007", 20 pgs.
"Chinese Application Serial No. 02811759.X, Response filed Feb. 22, 2008", 10 pgs.
"Chinese Application Serial No. 02811759.X, Response filed May 14, 2009", 15 pgs.
"Chinese Application Serial No. 2008-312199, Office Action mailed Jan. 4, 2011", 4 Pgs.
"European Application Serial No. 02706286.8, Office Action mailed Aug. 31, 2010", 5 Pgs.
"International Application Serial No. PCT/US02/04600, International Preliminary Examination Report mailed May 3, 2003", 3 pgs.
"Japanese Application Serial No. 2003-504306, Preliminary Amendment mailed Jan. 11, 2006", 8 pgs.
"Japanese Application Serial No. 2003-504306, Response filed Jul. 15, 2008", 24 pgs.
"Korean Application Serial No. 10-2009-7007814, Response filed Dec. 14, 2009", 55 pgs.
"Korean Application Serial No. 2003-7016152, Office Action mailed Dec. 14, 2007", 7 pgs.
"Korean Application Serial No. 2003-7016152, Response filed Apr. 16, 2007", 24 pgs.
"Korean Application Serial No. 2003-7016152, Response filed Aug. 20, 2007", 6 pgs.
"Korean Application Serial No. 2007-7029722, Response filed Apr. 16, 2009", 22 pgs.
"Korean Application Serial No. 2007-7029722, Response filed Oct. 31, 2008", 33 pgs.
"Korean Application Serial No. 2007-7029722, Response filed Nov. 19, 2009", 25 pgs.
Seki, N., ""What Site is Influential as a Portal"", Nikkei Computers, Nikkei Business Publication Inc. vol. 454, pp. 98-99.
"U.S. Appl. No. 12/475,997 , Response filed Jan. 19, 2012 to Final Office Action mailed Oct. 19, 2011", 12 pgs.
"U.S. Appl. No. 12/475,997 , Response filed Jun. 13, 2012 to Non Final Office Action mailed Feb. 13, 2012", 12 pgs.
"U.S. Appl. No. 12/475,997, Advisory Action mailed Jan. 27, 2012", 3 pgs.
"U.S. Appl. No. 12/475,997, Final Office Action mailed Oct. 19, 2011", 18 pgs.
"U.S. Appl. No. 12/475,997, Non Final Office Action mailed Feb. 13, 2012", 14 pgs.
"European Application Serial No. 10783927.6, Office Action mailed Jan. 24, 2012", 2 pgs.
"European Application Serial No. 10783927.6, Response filed Jun. 8, 2012 to Office Action mailed Jan. 24, 2012", 11 pgs.
"International Application Serial No. PCT/US2010/036907, International Preliminary Report on Patentability mailed Dec. 15, 2011", 8 pgs.
"Japanese Application Serial No. 2008-312199, Office Action mailed Sep. 5, 2011", with Partial English translation., 4 pgs.

"Korean Application Serial No. 10-2009-7007814, Notice of Allowance mailed May 1, 2012", With English translation, 3 pgs.
"Korean Application Serial No. 10-2009-7007814, Office Action mailed Feb. 15, 2012", With English Translation, 14 pgs.
"Korean Application Serial No. 10-2009-7007814, Response filed Apr. 16, 2012 to Office Action mailed Feb. 24, 2012", with English translation of claims, 22 pgs.
"Korean Application Serial No. 10-2009-7007814, Supplementary Appeal Brief filed Sep. 21, 2011", with English translation of claims, 17 pgs.
InterShopZone, The Online Interactive Marketplace Internet Site; Jul. 12, 2002; Auctionweiser Enterprises, Inc.
eDeal Marketplace Internet Site; Jul. 12, 2002; eDeal Services Corp.
International Search Report dated Oct. 2, 2002.
Malone, T.W.; Yates, J; et al., "Electronic Markets and Electronic Hierarchies", *Communications—of the ACM*, Jun. 1987, pp. 484-497, vol. 30, No. 6.
Warbelow, A; Kokuryo, J, "Aucnet: TV Auction Network System". *Harvard Business School Case/Study*, Jul. 1989, pp. 1-15, HBVR# 9-190-001, USA.
"Personal Optimized Decision/Transaction Program", *IBM Technical Disclosure Bulletin*, Jan. 1995, pp. 83-84, vol. 38, No. 1.
Neo, B.S, "The implementation of an electronic market for pig trading in Singapore", *Journal of Strategic Information Systems*, Dec. 1992, pp. 278-288, vol. 1.
Rockoff, T.E; Groves, M., "Design of an Internet-based system for remote Dutch auctions" *Internet Research—Electronic Networking Applications and Policy*, Jan. 1, 1995, vol. 5, No. 4, pp. 10-16.
Massimb, M.N; Phelps, B.D, "Electronic Trading, Market Structure and Liquidity", *Financial Analysts Journal*, Jan.-Feb. 1994, vol. 50, No. 1, pp. 39-50.
Post, D.L; Coppinger, S.S, et al., "Application of Auctions as a Pricing Mechanism for the Interchange of Electric Power", *IEEE Transactions on Power Systems*, Aug. 1995, pp. 7, vol. 10, No. 3.
Hess, C.M; Kemerer, C.F., "Computerized Loan Organization System: An Industry Case Study of the Electronic Markets Hypothesis", *MIS Quarterly*, Sep. 1994, vol. 18, No. 3, pp. 251-274.
Reck, Martin, "Formally Specifying and Automated Trade Execution System", *Journal of Systems and Software*, 1993, pp. 245-252, vol. 21.
"Anonymous Delivery of Goods in Electronic Commerce", *IBM Technical Disclosure Bulletin*, Mar. 1996, pp. 363-366, vol. 39, No. 3.
Lee, Ho G., " Electronic Brokerage and Electronic Auction: The Impact of IT on Market Structures", *Proceedings of the 29th HICSS*, 1996, pp. 397-406, vol. IV.
Clemons, E; Weber, B., "Evaluating the Prospects for Alternative Electronic Securities Markets", *International Conference on Information Systems*, 1991, pp. 53-61, vol. 12.
Mardesich, J., "Onsale takes auction gavel electronic", *Computer Reseller News*, Jul. 8, 1996, p. 2 continued on p. 32.
"Onsale joins fray as online shopping picks up speed: Internet Booms", *Computer Reseller News*, Jun. 5, 1995, p. 73 (www.dialogweb.com).
Siegmann, Ken, "Nowhere to go but up", *PC Week*, Oct. 23, 1995, p. 1-3, vol. 12, No. 42 (www.dialogweb.com).
"Onsale: Onsale Brings Thrill of Auctions and Bargain Hunting Online; Unique Internet retail service debuts with week-long charity auction for the Computer Museum in Boston", May 24, 1995, (pp. 3) Dialog Web. 0489267 BW0022.
Schmid, B.F., "The Development of Electronic Commerce", *Newsletter of the Competence Centre Electronic Markets*, Oct. 1993, No. 9/10.
Tjostheim, I; Eide, J., "A case study of an on-line auction for the World Wide Web", Norwegian Computing Center, No Date Given, www/nr.no/gem/elcom/publikasjoner/enter98e.html.
Graham, I., "The Emergence of Linked Fish Markets in Europe", *Focus Theme*, No Date Given.
Reck, Martin, "Trading-Process Characteristics of Electronic Auctions", *Focus Theme*, No Date Given.
Van Heck, E.; Ribbers, P.M., "Experiences with Electronic Auctions in the Dutch Flower Industry", *Focus Theme*, No Date Given.

Lee, H.G., "AUCNET: Electronic Intermediary for Used-car Transactions", *Focus Theme*, No Date Given.

Klein, S., "Introduction to Electronic Auctions", *Focus Theme*, No Date Given.

Turban, E., "Auctions and Bidding on the Internet an Assessment", *Focus Theme*, No Date Given.

Zwass, Vladimir, "Electronic Commerce: Structures and Issues", *International Journal of Electronic Commerce*, Fall 1996, pp. 3-23, vol. 1, No. 1, pp. 3-23 (www.cba.bgsu.edu).

Priest, Chris; van Tol, Maarten, "Adaptive agents in a persistent shout double auction", Proceedings of the First International Conference on Information and Computation Economies, Oct. 25-281, 1998, Charleston, US.

Resnick, Paul; Zeckhauser, Richard; Friedman, Eric; Kuwabara, Ko, "Reputation Systems", Association for Computing Machinery, *Communications of the ACM*, vol. 43, No. 12, pp. 45-48 ((Dialog.

Meade, Jim, visual 360: a performance appraisal system that's "fun"., *HR Magazine*, Jul. 1999 (Dialog file).

Novelli, Brodeur Porter, *Mediappraise: Mediappraise Receives National Award for Web-based Technology That Emables COmpanies to Solve Thorny HR Problem*, Busniness Wire, Raleigh, N.C., Dec. 14, 1998.

"U.S. Appl. No. 12/475,997, Final Office Action mailed Feb. 1, 2013", 15 pgs.

\* cited by examiner ebay©

| home | my eBay | site map | sign in |

| Browse | Sell | Services | Search | Help | Community |

Find any Artist      CDNOW
Right now@CDNOW → Buy Music

▸ Try 12 issues of Time magazine for FREE    ▸ Shop at a Store today

[Piper Cherokee 140] [Search]

☐ Search titles and descriptions to find more items
☐ Show only Auction for American items Sort by: items ending first | newly listed first | lowest prices first | highest prices first | items near me 5 items *found for* PiperCherokee 140. Showing items 1 to 5.

All items    All items including Gallery preview    Gallery items only
            Current Items

| Item# | | Price | Bids | Ends PDT |
|---|---|---|---|---|
| 1636771119 | PIPER CHEROKEE 140. 1968 No Reserve 🖼️📷🎁 ≡ *BUY it Now* $30,000.00 | | | Sep-19 10:00 |
| 1638638059 | Piper Cherokee 140 Cruiser Academy Model 📷 | $7.95 | | Sep-21 18:37 |
| 1638898376 | Guillow Wood Piper Cherokee 140 Plane Kit 📷  115 | $13.50 | | Sep-22 16:18 |
| 1638709827 | GUILLOWS PIPER CHEROKEE 140 20" SPAN MIB NB 🎁 | $12.00 | | Sep-25 00:05 |
| | ≡ *BUY it Now*  120 | | | |
| 1466542967 | Cherokee 140 "B" Owners Handbook. Piper 📷 | $9.99 | | Sep-28 07:46 |

Back to Top                                                    Page 1 of 1

Note: Bid counts and amounts may be slightly out of date.
Click on the specific item(s) you are interested in for up-to-date information.

For more items, click these pages:
= 1 = 2 (next page)

*FIG. 1*

FIG. 8 eBay©

Stores | Real Estate home my eBay site map sign in

| Browse | Sell | Services | Search | Help | Community |

▲ Open your Store Now
▲ Stores help for Buyers | Sellers eBay Stores > Real Estate Additional Stores Search for Buy it Now items in Stores

[                    ] Search Store

☐ Search titles and descriptions
☐ Show only Auction for American items
View Stores Alphabetically
[                    ]

Buy-A-Few
PC;Collectables:Diecast,Books,Action Figures...
135 items

Holiday Group Timeshare Resales
Holiday Group features top-valuetimeshare re...
81 items Gigglestick's Emporium
20 items Timeshares by Century21
Century21 Vacation Properties is the world...
14 items land-trader.com
Specializing in vacant/raw land Western U.S. ...
10 items Crimson Cliffs Outdoor Products
elcome you to Cromson Cliffs Outdoor Prod...
5 items Buy Land Today
We buy land in volume from various sources an...
4 items Mighty Oak Properties
Low Down & Easy Terms for Real Property
3 items Florida Home Rental Services
Florida Home Rental Service provides a listing...
3 items

Stores

Antiques For Us

[computer] [Search Store]

☑ Search titles and descriptions (to find more items!)

160 items found for cat in Seller's Store

All Items home my eBay site map sign in

[Browse] [Sell] [Services] [Search] [Help] [Community]

[categories] [regions] [themes] [Stores]

[Store Items] | [Feedback] | [Store Policies] | [About the Store]

Search Antiques for us                                    Search Results - All

◀ Back to Store Home

View Auction Items | View But It Now Items

| Picture | All Items | Price | | Ends PST |
|---|---|---|---|---|
| | EXPOSE "WHAT YOU DON'T KNOW 1973 Volkswagen Beetle Item Bus VW Super GIFT | $11.99 $9.99 | ≡ *BUY it Now* ≡ *BUY it Now* | — 02/15/01 |
| | EXPOSE "WHAT YOU DON'T KNOW New Item Out "Galloping Horse" LAST ONE L@@K EXPOSE "WHAT YOU DON'T KNOW VENGABOYS rare HOLLAND 2trCD collectors item | $9.99 $8.99 $7.99 $7.99 | 1 bid ≡ *BUY it Now* ≡ *BUY it Now* ≡ *BUY it Now* | — — — — |
| | EXPOSE "WHAT YOU DON'T KNOW PROMO ITEM FROM THE MOVIE THE TOXIC AVENGER New Item Out "Galloping Horse" LAST ONE L@@K EXPOSE "WHAT YOU DON'T KNOW Coca-Cola MUSICAL Polar Bears-Retired Item- | $7.99 $7.99 $7.99 $6.99 $6.99 | ≡ *BUY it Now* ≡ *BUY it Now* ≡ *BUY it Now* ≡ *BUY it Now* ≡ *BUY it Now* | — in 13 mins in 13 mins in 13 mins |

} 1101

Page 1 of 3   [Next]                              go to top of page

Note: Bid counts may be slightly out of date.

METHOD AND SYSTEM AUTOMATICALLY TO SUPPORT MULTIPLE TRANSACTION TYPES, AND TO DISPLAY SELLER-SPECIFIC TRANSACTIONS OF VARIOUS TRANSACTION TYPES IN AN INTEGRATED, COMMINGLED LISTING

RELATED APPLICATION

This application is related to and hereby claims the priority benefit of the following provisional application for patent U.S. Provisional Application No. 60/297,665, filed Jun. 11, 2001.

FIELD OF THE INVENTION

The present invention relates generally to the field of electronic commerce, and more specifically to a method and system for facilitating an electronic commerce transaction.

BACKGROUND OF THE INVENTION

More and more Internet users are realizing the ease and convenience of buying and selling online by way of person-to-person online trading pioneered by eBay Inc., the assignee of the present invention. As a result, collectors, hobbyists, small dealers, unique item seekers, bargain hunters, and other consumers, are able to buy and sell millions of items at various online shopping sites.

The success of an online shopping site depends upon its ability to provide an enjoyable shopping experience and an easy-to-use environment in which buyers and sellers can conduct business efficiently. Current online shopping sites have certain limitations in the manner in which they present information to users. With reference to FIG. 1, a typical item listing will briefly be described. A textual list of items 105 representing the results of a user query is presented within a web page format 100 to the user (e.g., a prospective buyer) on his/her computer system. In this example, the web page format 100 presented to the prospective buyer includes items 110 that are currently available for sale on a particular page 170 within a particular category. Each item 110 includes a hypertext link 115 having a title (or brief description) of the item for sale, an indication 120 of whether or not an image of the item is available, the current minimum bid 130, the number of bids received 140, and an auction ending time 150. Based upon the item titles, prospective buyers can decide whether or not to view more detailed information on a particular item. In order to view detailed information on a particular item of interest, the buyer is required to select the hypertext link 115 associated with the item. A new page is then presented with more detailed information regarding the item selected. The more detailed information may include, among other things, the item's starting price, a username associated with the seller of the item, a username associated with the current high bidder, a detailed description of the item in text or HTML format, and an image the seller has associated with the item, for example.

SUMMARY OF THE INVENTION

According to one aspect of the invention, there is provided a method to facilitate a transaction by a network-based transaction facility. In one embodiment, the method includes receiving a request from a buyer accessing the network-based transaction facility to view offerings that are offered for sale via the network-based transaction facility. The method further includes responding to the request by retrieving information concerning a plurality of offerings, wherein the plurality of offerings include a first offering of a first transaction type and a second offering of a second transaction type. Further, the method includes integrating information concerning the first and second offerings into a commingled list and causing the display of the commingled list to the buyer.

BRIEF DESCRIPTION OF THE DRAWINGS

The present invention is illustrated by way of example and not limitation in the figures of the accompanying drawings, in which like references indicate similar elements and in which:

FIG. 1 illustrates an exemplary user interface that contains a listing of offerings that are the subjects of commerce transactions.

FIG. 8 illustrates an exemplary user interface that contains a listing of Seller virtual stores, where the listing is based on a category (e.g. Real Estate) of Seller virtual stores.

FIG. 11 illustrates an exemplary user interface with a commingled listing of items offered by a specific Seller's virtual store, where the commingled listing of items meet a Buyer's search criteria.

FIG. 13 illustrates an exemplary interface where a Buyer has selected "View Buy It Now Items" from the interface 900 of FIG. 9.

DETAILED DESCRIPTION

A method and system automatically to support multiple transaction types, and to display seller-specific transactions of various transaction types in an integrated, commingled listing are described. In the following description, for purposes of explanation, numerous specific details are set forth in order to provide a thorough understanding of the present invention. It will be evident, however, to one skilled in the art that the present invention may be practiced without these specific details.

Terminology

For the purposes of the present specification, the term "transaction" shall be taken to include any communications between two or more entities and shall be construed to include commercial transactions including sale and purchase transactions, auctions and the like. The term "offering" shall be taken to include any products, services or goods that are made available for purchase, or offered for sale. While an exemplary embodiment of the present invention is discussed below with reference to "items", it will be appreciated that the present invention is not so limited.

Transaction Facility

Figure 2:
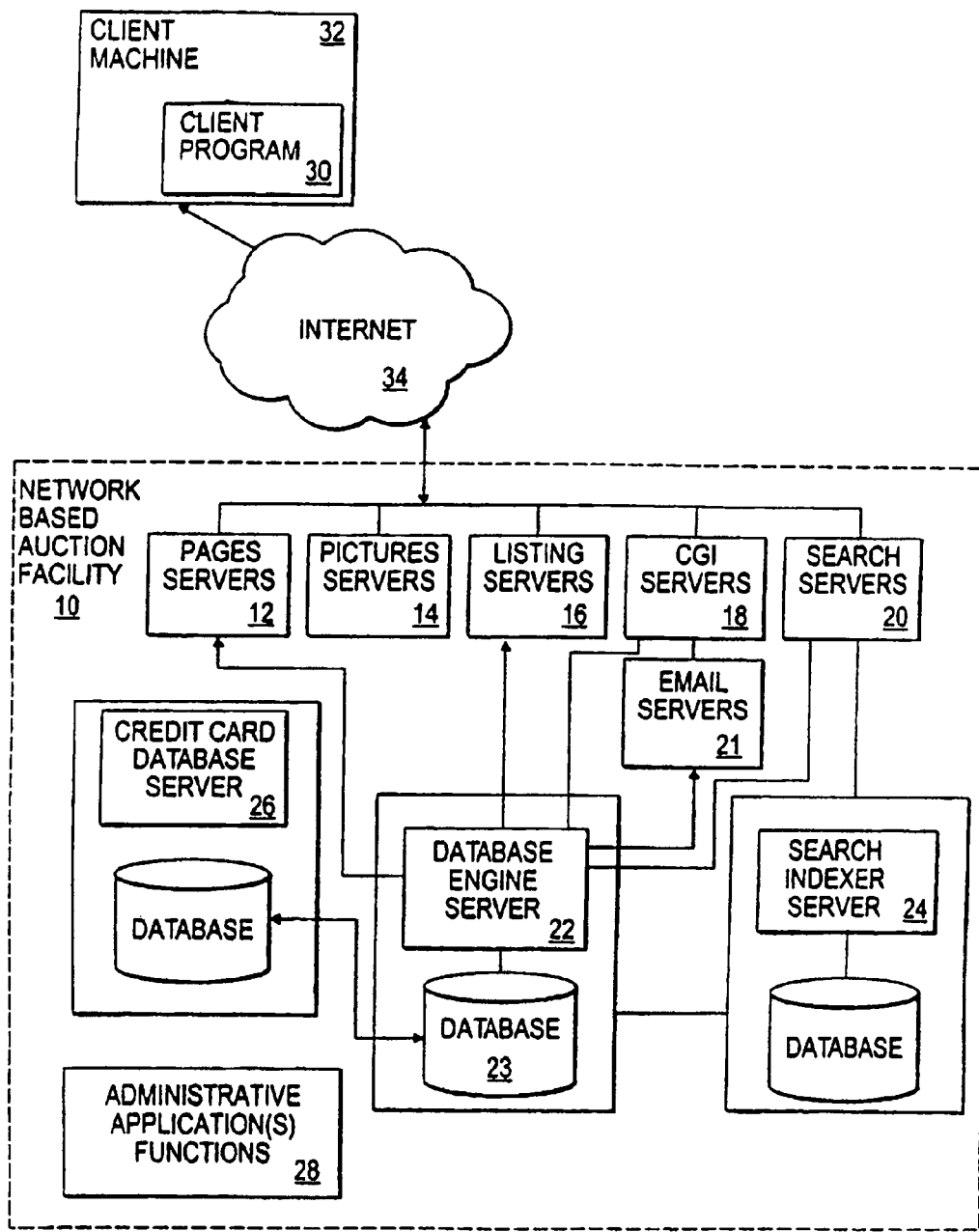
FIG. 2 is a block diagram illustrating an exemplary network-based transaction facility in the form of a network-based auction facility 10.

FIG. 2 is block diagram illustrating an exemplary network-based transaction facility 10. While an exemplary embodiment of the present invention is described within the context of a transaction facility, the invention will find application in many different types of computer-based, and network-based, commerce facilities.

The transaction facility 10, in an exemplary embodiment, includes one or more of a number of types of front-end servers that each include at least one Dynamic Link Library (DLL) to provide certain functionality. Page servers 12 deliver web pages (e.g., markup language documents), picture servers 14 dynamically deliver images to be displayed within Web pages, listing servers 16 facilitate category-based browsing of offerings, search servers 20 that handle search requests to the facility 10 and facilitate keyword-based browsing of offerings, and CGI or ISAPI servers 18 provide an intelligent interface to the back-end of facility 10. E-mail servers 21 provide, inter alia, automated e-mail communications to users of the facility 10.

The page servers 12, picture servers 14, CGI/ISAPI servers 18, search servers 20, e-mail servers 21 and database engine server 22 may individually, or in combination, act as a communication engine to facilitate communications between, for example, the client machine 32 and the network-based transaction facility 10. In addition, the page servers 12, picture servers 14, CGI/ISAPI servers 18, search servers 20, e-mail servers 21 and database engine server 22 may individually, or in combination, act as a transaction engine to facilitate transactions between, for example, the client machine 32 and the network-based transaction facility 10. Furthermore, the page servers 12, picture servers 14, CGI/ISAPI servers 18, search servers 20, e-mail servers 21 and database engine server 22 may individually, or in combination, act as a display engine to facilitate the display of items between, for example, the client machine 32 and the network-based transaction facility 10.

The back-end servers include a database engine server 22, a search index server 24 and a credit card database server 26, each of which maintains and facilitates access to a respective database.

The Network-based transaction facility 10 may be accessed by a client program 30, such as a browser (e.g., the Internet Explorer distributed by Microsoft Corp. of Redmond, Wash.) that executes on a client machine 32 and accesses the facility 10 via a network such as, for example, the Internet 34. Other examples of networks that a client may utilize to access the transaction facility 10 include a wide area network (WAN), a local area network (LAN), a wireless network (e.g., a cellular network), or the Public Switched Telephone Network (PSTN) network.

Database Structure

Figure 3:
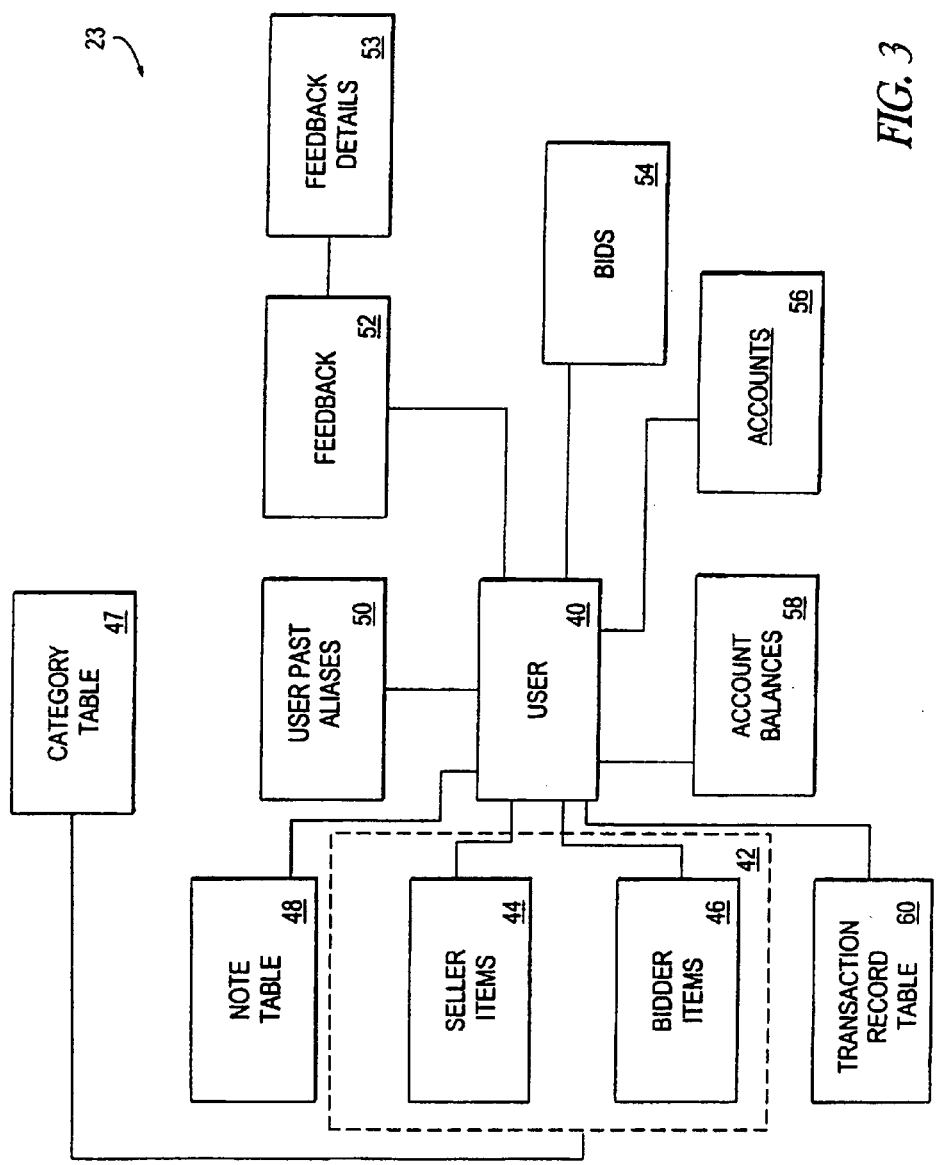
FIG. 3 is a database diagram illustrating an exemplary database, maintained and accessed via a database engine server, which at least partially implements and supports the auction facility.

FIG. 3 is a database diagram illustrating an exemplary database 23, maintain by and accessed via the database engine server 22, which at least partially implements and supports the transaction facility 10. In the exemplary embodiment, the database engine server 22 maintains two databases $23_a$ and $23_b$, a first database $23_a$ being maintained for offering information that is not included within a virtual "store" according to the present invention, with a second database $23_b$ storing offering information for offerings that are presented via virtual "stores". The structure of these databases $23_a$ and $23_b$ are substantially the same, but differ in that the tables of the "store" database $23_b$ may include a number of additional fields to facilitate the virtual stores. A general discussion of the basic structure of a database 23 is presented below, this being applicable to both databases $23_a$ and $23_b$.

The database 23 may, in one embodiment, be implemented as a relational database, and includes a number of tables having entries, or records, that are linked by indices and keys. In an alternative embodiment, the database 23 may be implemented as collection of objects in an object-oriented database.

Central to the database 23 is a user table 40, which contains a record for each user of the transaction facility 10. A user may operate as a seller, buyer, or both, within the transaction facility 10. The database 23 also includes items tables 42 that may be linked to the user table 40. The items tables 42 may include a seller items table 44 and a bidder items table 46. A user record in the user table 40 may be linked to multiple items that are being, or have been, auctioned or otherwise offered for sale via the facility 10. A link indicates whether the user is a seller or a bidder (or buyer) with respect to items for which records exist within the items tables 42.

The database 23 also includes one or more category tables 47. Each record within the category table 47 describes a respective category. In one embodiment, a specific category table 47 describes multiple, hierarchical category structures, and includes multiple category records, each of which describes the context of a particular category within the one of the multiple hierarchical category structures. For example, the category table 47 may describe a number of real, or actual, categories to which item records, within the items tables 42, may be linked.

The database 23 also includes a note table 48 populated with note records that may be linked to one or more item records within the items tables 42 and/or to one or more user records within the user table 40. Each note record within the table 48 may include, inter alia, a comment, description, history or other information pertaining to an item being auctioned via the transaction facility 10, or to a user of the transaction facility 10.

A number of other tables are also shown to be linked to the user table 40, namely a user past aliases table 50, a feedback table 52, a feedback details table 53, a bids table 54, an accounts table 56, an account balances table 58 and a transaction record table 60.

Figure 4:
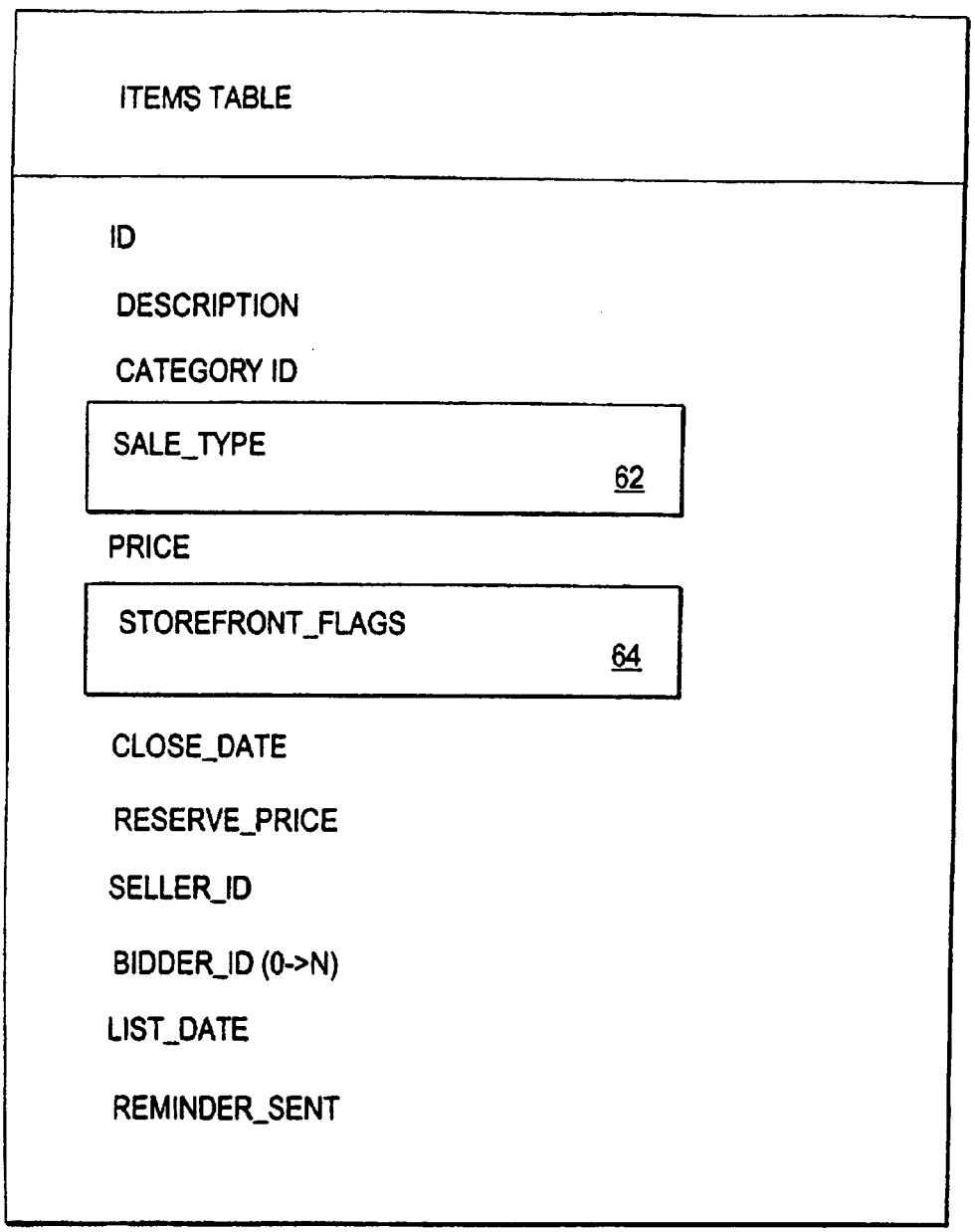
FIG. 4 is a representation of an item table, according to an exemplary embodiment of the present invention.

FIG. 4 is a diagrammatic representation of an items table 42, according to an exemplary embodiment of the present invention. The items table 42 is shown to define a number of fields for each record that describes an item being offered for sale via the transaction facility 10. A sale type field 62 records the type of item (e.g., auction, fixed-price). In one embodiment, the type of item indicates a price-setting process via which a price for the relevant items may be established. Also, a storefront flag field 64 designates whether an item in the network-based transaction facility 10 is offered at a Seller's virtual store.

Figure 5:
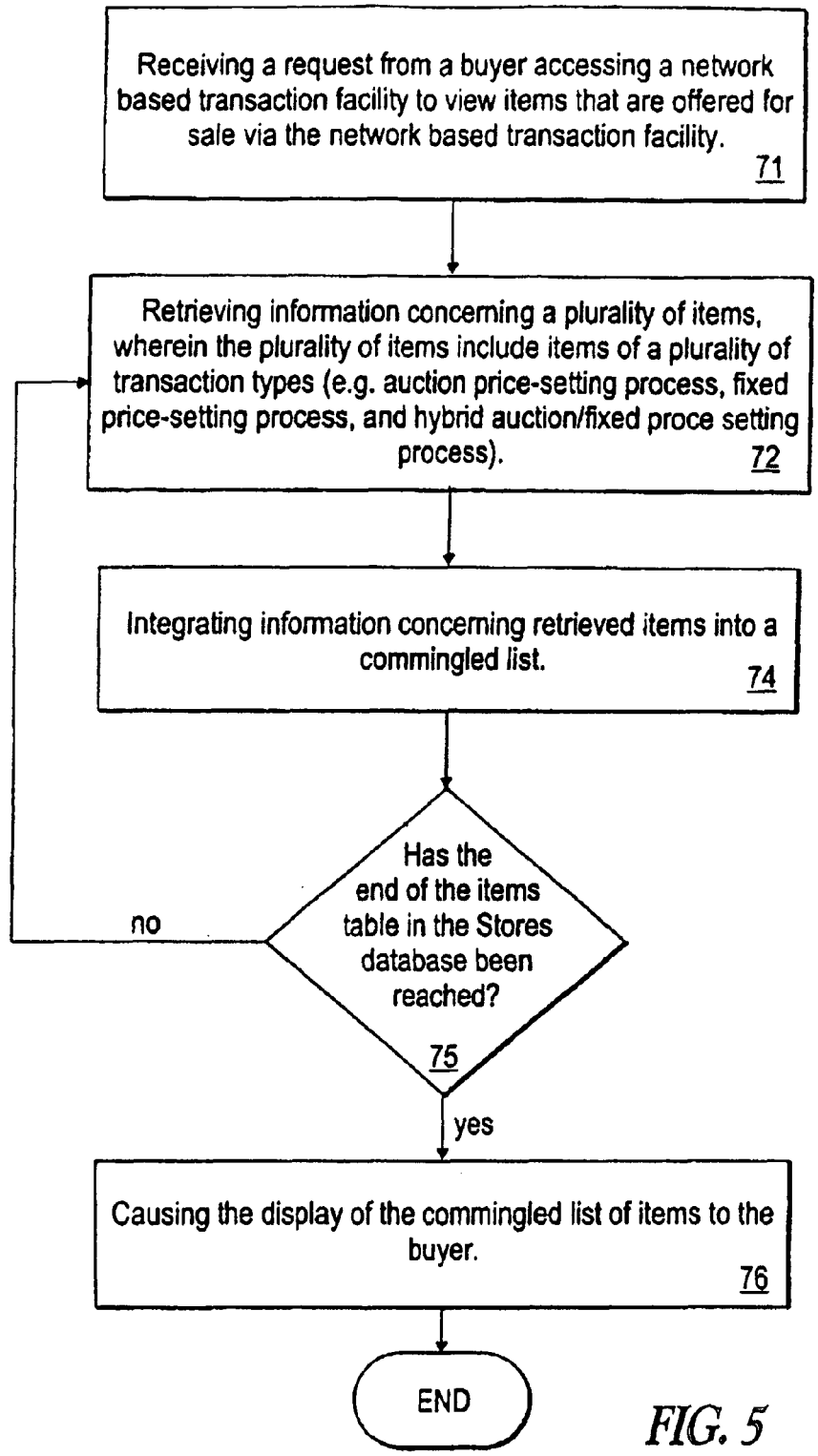
FIG. 5 is a flowchart illustrating a method, according to an exemplary embodiment of the present invention, of displaying a commingled of items.

FIG. 5 is a flow chart illustrating a method 70, according to an exemplary embodiment of the present invention, of locating and displaying a plurality of items offered by a Seller where the items are of a plurality of transaction types. In the exemplary method 70, the presentation of the commingled list is the presentation of the commingled list on a user graphical interface. The plurality of items available are recorded within the items table 42 of the database 23.

The plurality of items includes a first offering of a first transaction type and a second offering of a second transaction type. The first transaction type implements a first price setting process and the second transaction type implements a second price setting process. At least one of the first and second price-setting processes includes a fixed price-setting process, an auction price-setting process, and a hybrid auction/fixed price-setting process.

The fixed price-setting process provides items with a price that does not change after listing, and which allows buyers to purchase quantities of the item instead of going through an auction process. The initial quantity of a fixed-priced item can be one or more. The auction price-setting process allows multiple users (e.g., Buyers) to bid on items for a fixed period of time after which the user with the highest bid may buy the item at a submitted bid price. The hybrid auction/fixed price setting process allows a Buyer to purchase an item at a fixed price before an initial bid can be placed on an item. Buy It Now items (BIN) are items in an auction that have a quantity of one, but also have both an initial bid amount and a BIN amount. Before any bids are placed on an item, a buyer can go through the BIN process to immediately end the auction and win the item by agreeing to pay the BIN price. If a buyer bids on the auction, the item converts to a normal auction and no longer has a BIN price or allows a BIN process.

Figure 6:
FIG. 6 illustrates an exemplary user interface that contains a hyperlink to a user interface from which a Buyer can choose a Seller's virtual store
Figure 7:
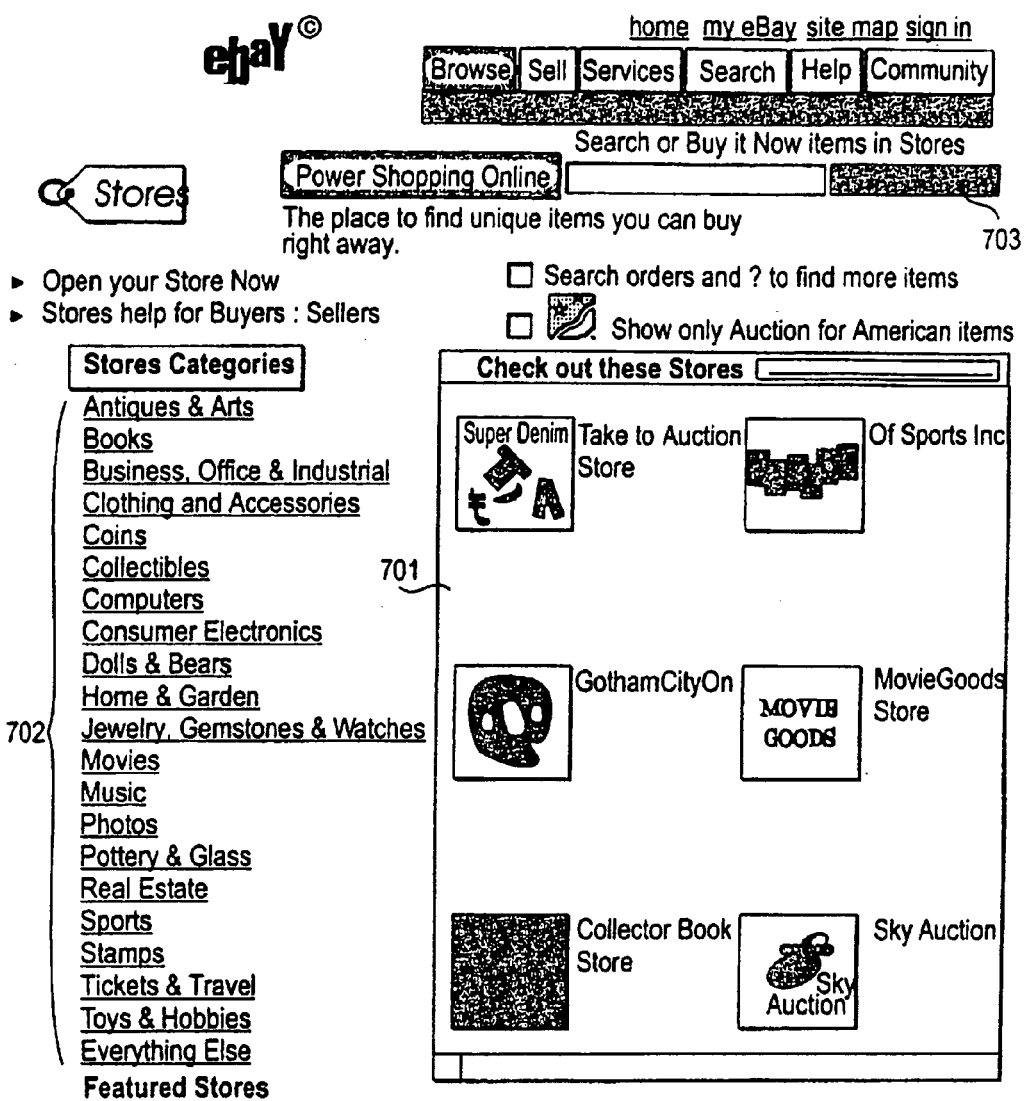
FIG. 7 illustrates an exemplary user interface that contains a listing of Seller virtual stores in a network based commerce facility.

Returning now specifically to the flow chart, at block 71, the network-based transaction facility 10 receives a buyer's request to view the items in a seller's virtual store. FIG. 6 illustrates an exemplary user interface that includes a "Stores" portion. If selected the "Stores" portion 601 provides the user with an interface which allows users to select a seller's virtual store from a listing of featured stores or from listing of stores provided according to category (e.g. books, antiques). In response to a Buyer selecting "Stores" from the exemplary interface provided in FIG. 6, the exemplary interface 700 of FIG. 7 is provided. FIG. 7 illustrates an exemplary user interface that allows a user to select a seller's virtual store from a listing of featured stores 701 or from listings of stores provided according to category 702. A Buyer may select a featured store 701 or select a category 702 of stores to view. Upon choosing a category 702 of stores (e.g. Real Estate) the Buyer is further provided with an interface displaying a list of stores based on the category selected. FIG. 8 illustrates an exemplary interface 800 at which a listing of stores based on a category is chosen. The Buyer may select a specific Seller's virtual store from the interface 800 of FIG. 8.

Figure 9:
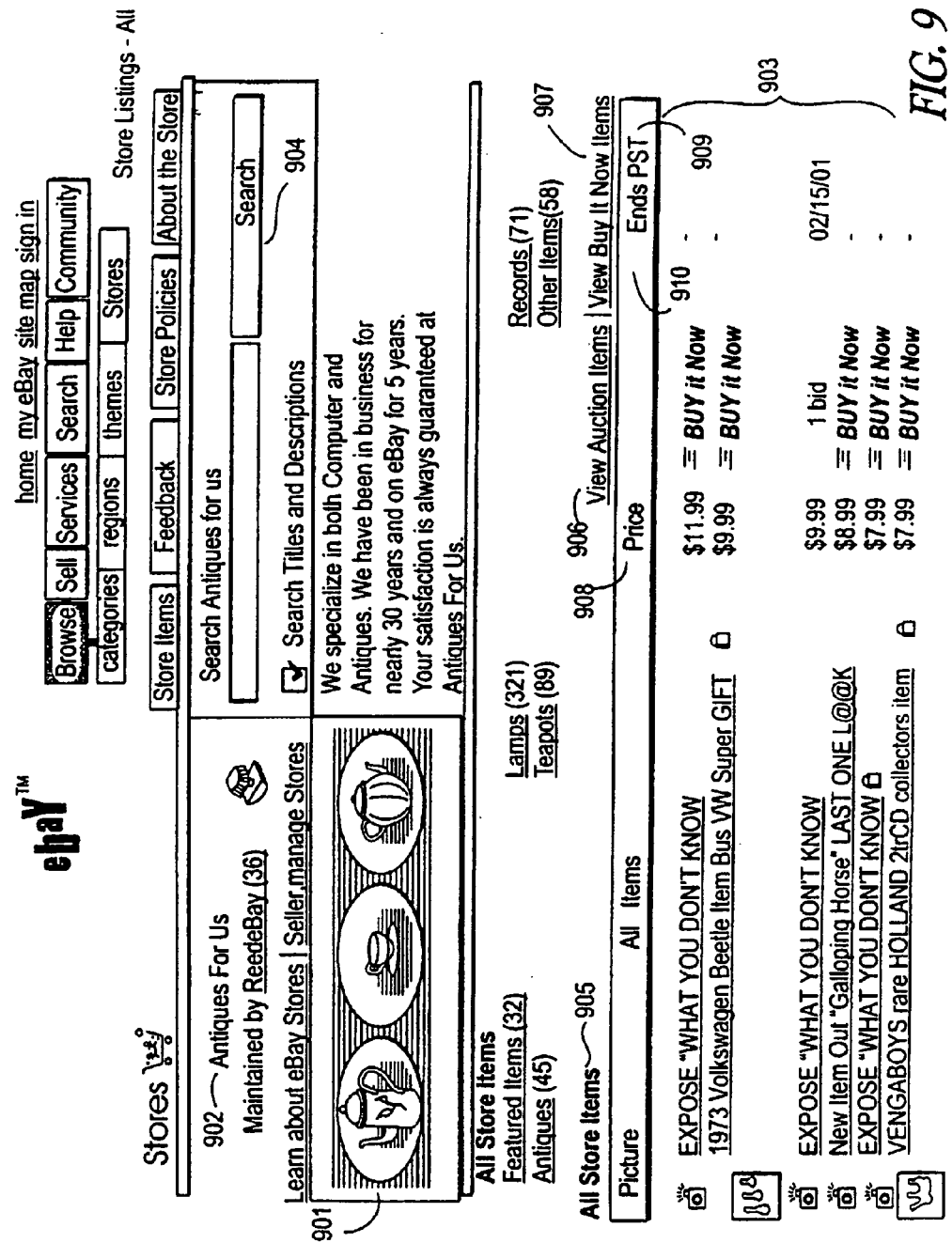
FIG. 9 illustrates an exemplary user interface that contains a listing of offerings for a specific Seller's virtual store, where the listing is commingled list of items of multiple transaction types.

The Seller's virtual store may consist of multiple items of multiple transaction types (e.g. fixed price-setting process, auction price-setting process, or hybrid auction/fixed price setting process). The Seller's virtual store items are items listed by virtual store owner (e.g., Seller). FIG. 9 illustrates an exemplary interface 900 of a Seller's virtual store according to one embodiment. The Seller's virtual store interface 900 has a different display from the core listings (e.g. network based auction home page). There is a Store logo 901 and Store name 902 on top of every Store specific listings page. All the branding bar tabs for each Seller's virtual store is constructed and displayed on the top of the Stores listings page.

Returning now specifically to the flow chart, at block 72, responsive to the Buyer selecting a Seller's virtual store, a look-up is performed within the database 23, and specifically on the items table 42, to obtain a title and other details (e.g. transaction type, price) regarding one or more items that are available at the Seller's virtual store selected by the Buyer. The items which are offered at the Seller's virtual store may be of multiple transaction types.

After locating an item, at block 72 the item is retrieved. Retrieving the item includes retrieving additional information (e.g. title, description, price, end of auction time, thumbnail image, number of bids, applicable icons) associated with the item. As the items of multiple transaction types are retrieved, at block 74 they are integrated into a commingled list. The list is known as a commingled list because the items may be of multiple transaction types. At block 75, a determination is made as to whether the end of the items table 42 in the database 23 has been reached. Following a negative determination at decision block 75, the method 70 loops back to block 72 and the search of the items table 42 in the database 23 for items being offered by the Seller's virtual store continues.

On the other hand, following a positive determination at decision block 75, the method proceeds to block 76, where a commingled list is displayed for the buyer on a user graphical interface. Referring briefly back to FIG. 9, an exemplary embodiment of a commingled listing of items 903 in a Seller's virtual store interface 900 is provided.

The Buyer may reduce the number of items in the commingled list by requesting that only items which meet a certain search criteria are to be displayed. Also, the Buyer may request to display only those items in the commingled list, which meet a specific transaction type (e.g. Auction Items, Fixed Price Items). Furthermore, the Buyer may sort the commingled list (e.g. according to price). The exemplary interface 900 illustrated in FIG. 9 includes a "Search" portion 904, an "All Items" portion 905, a "View Auction Items" portion 906, "View Buy It Now Items" portion 907, a Price portion 908, an End Time portion 909, and a Bids portion 910. The commingled list of items 903 may exist on multiple pages where each page will display a variable number of items included in the commingled list. In an exemplary embodiment, each page may include as many as 50 items per page.

Figure 10:
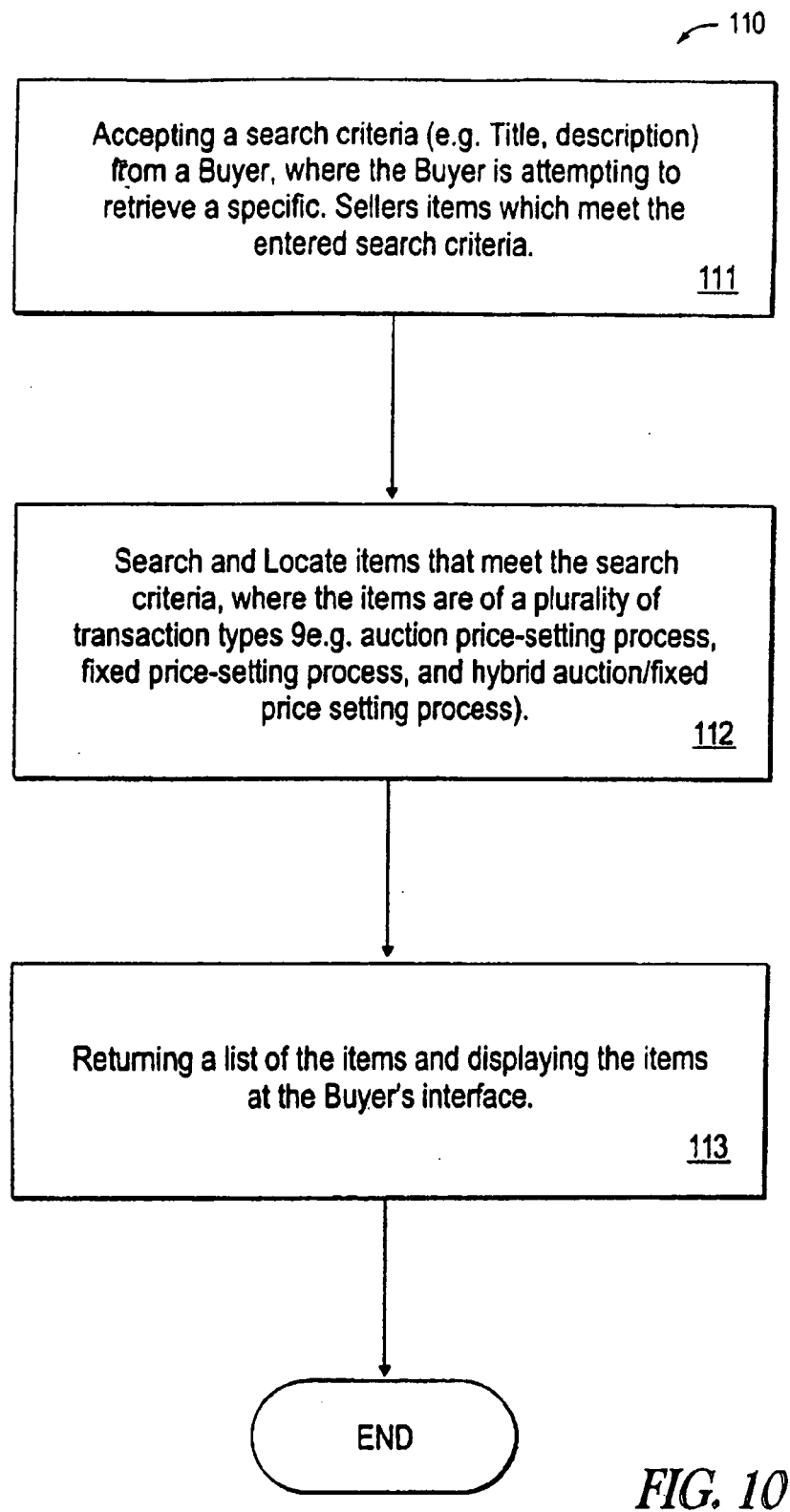
FIG. 10 is a flow chart illustrating a method according to an exemplary embodiment of the present invention, of displaying a commingled list of items offered by a specific Seller's virtual store, where the commingled listing of items meet a Buyer's search criteria.

FIG. 10 is a flow chart illustrating a method 110, according to an exemplary embodiment of the present invention, of displaying a commingled of items offered at a Seller's virtual store, where the items offered meet a search criteria provided by the Buyer. The method 110 shall be described within the context of the exemplary user interface 900 shown in FIG. 9.

At block 111, the network based auction facility 10 accepts a search criteria from a buyer, where the Buyer is attempting to search for items which meet a specific search criteria in a specific Seller' virtual store. At interface 900, the search criteria are entered at a "Search" portion 904. In an exemplary embodiment of the invention, at block 112, the items table 42 of the Stores database 23 is searched for items in the Specific Seller's virtual store that meet the search criteria provided by the buyer. The keywords would be used to search the Seller's virtual store by item title or item description. Items located in the Items table 42 of the Database 23 which belong to the Seller are further inspected to determine if they meet the search criteria entered by the Buyer. At block 113, the search returns a list of all items offered by the Seller's virtual store and displays the items at the Buyer's interface. FIG. 11 illustrates an exemplary interface 1100 with a commingled listing of items 1101 offered by a specific Seller's virtual store, where the commingled listing of items meet a Buyer's search criteria.

Figure 12:
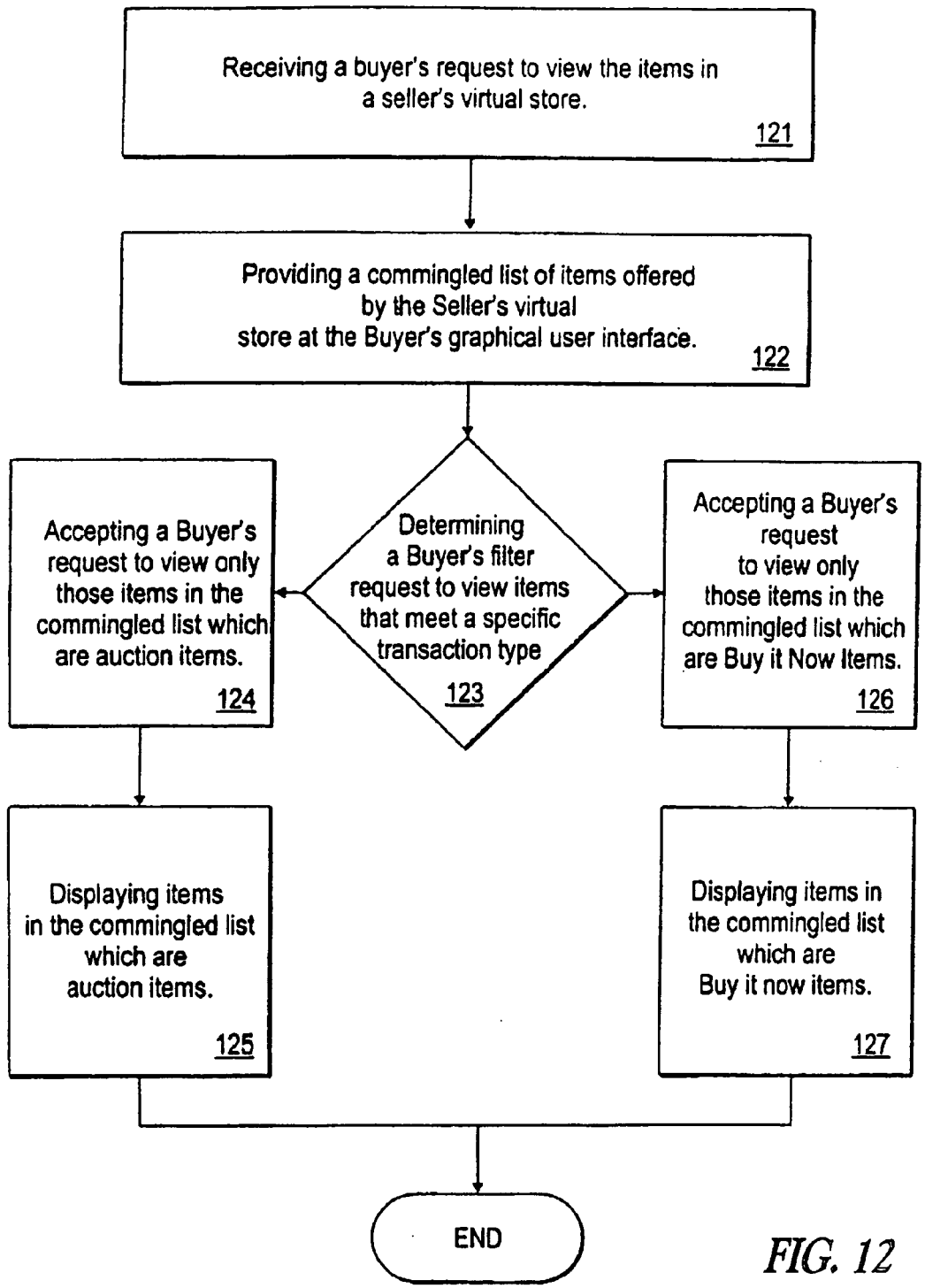
FIG. 12 is a flow chart illustrating a method according to an exemplary embodiment of the present invention, of displaying a commingled list of items offered at a Seller's virtual store, where the commingled list may be filtered so that only items which meet a specific transaction type (e.g. Auction Items, Fixed Price Items) are displayed.

FIG. 12 is a flow chart illustrating a method 120, according to an exemplary embodiment of the present invention, of displaying a commingled of items offered at a Seller's virtual store, where the commingled list may be filtered so that only items which meet a specific transaction type (e. g. Auction Items, Fixed Price Items) are displayed. The method 120 shall be described within the context of the exemplary user interface 900 shown in FIG. 9 as generated by the method 70 described above with reference to FIG. 5.

At block 121, the network based auction facility 10 receives a buyer's request to view the items in a seller's virtual store. At block 122, as described above by the method 70 with reference to FIG. 5, a commingled list of items 903 offered by the Seller's virtual store is provided at the Buyer's graphical user interface.

In an exemplary embodiment of the invention, at block 123, a Buyer may select "View Auction Items" 906 or "View Buy It Now Items" 907 to view only those items in the commingled list that meet a specific transaction type (e.g. Auction Items, Fixed-Price Items). In the exemplary method, at block 124, if the Buyer selects "View Auction Items" a lookup of the items table 42 in the database 23 is performed and all auction items offered at the Seller's store are displayed for the Buyer. The Buyer may select "View All Items" to return to the commingled list of all items displayed at the interface 900 of FIG. 9.

Figure 13:
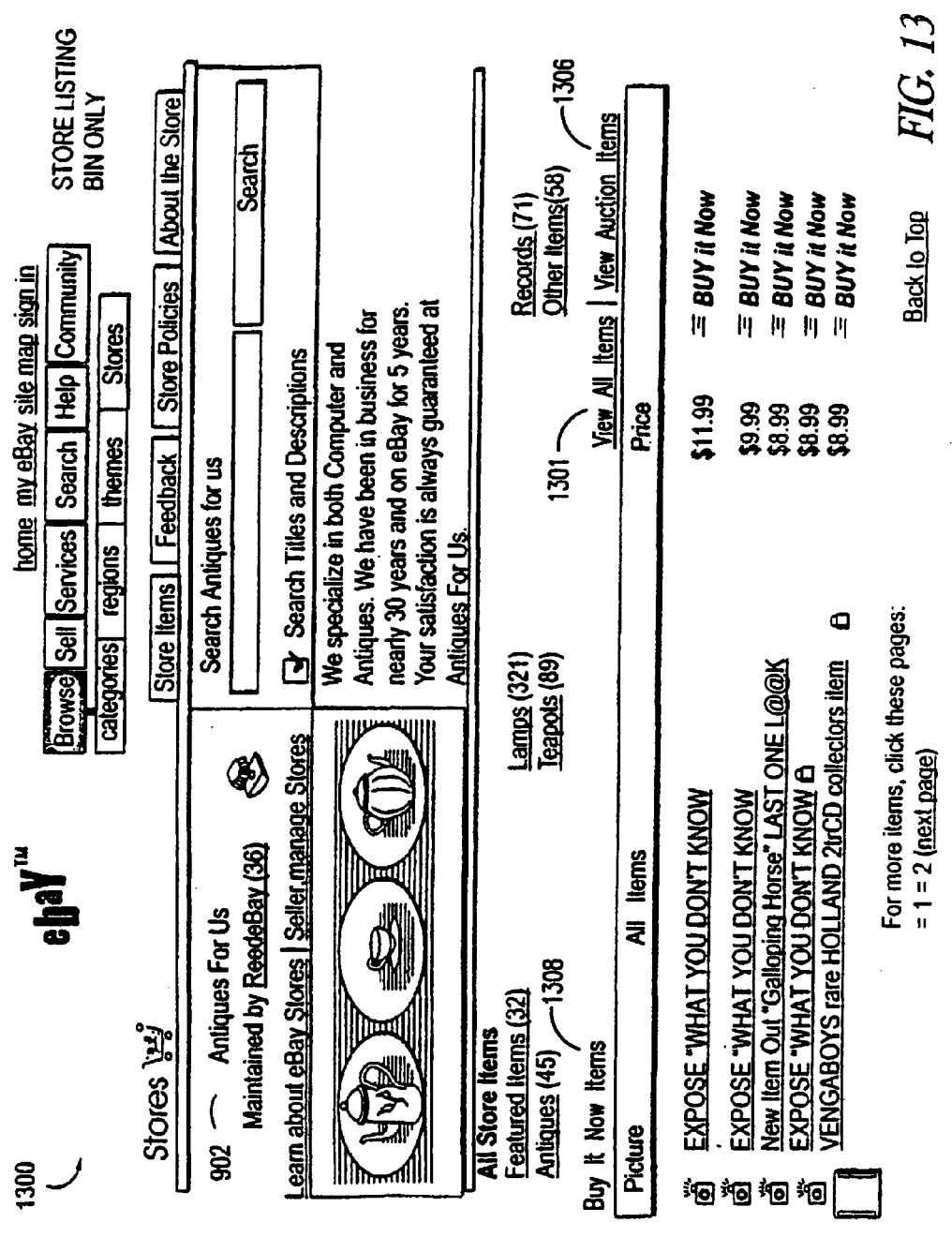

In the exemplary method, at block 125, if the Buyer selects "View Buy It Now Items" 907, a lookup of the items table 42 in the database 23 is performed and all fixed price items and auction items which have a fixed-price option before bidding has begun on the item will be displayed for the Buyer in a commingled list. If the item is only being offered at a fixed-price there will be no end time listed. However, if the item is an item that becomes an auction item after a first bid is entered, it will have an end time listed. FIG. 13 illustrates an exemplary interface 1300 where a Buyer has selected "View Buy It Now Items" 907 from the interface 900 of FIG. 9. The Buyer may select "View All Items" 1301 to return to the commingled list of all items displayed at the interface 900 of FIG. 9. The Buyer may further enter a keyword search after selecting the "View Auction Items" option 1306 or the "Buy It Now Items" option 1308 to view only those items that meet search word criteria.

Figure 14:
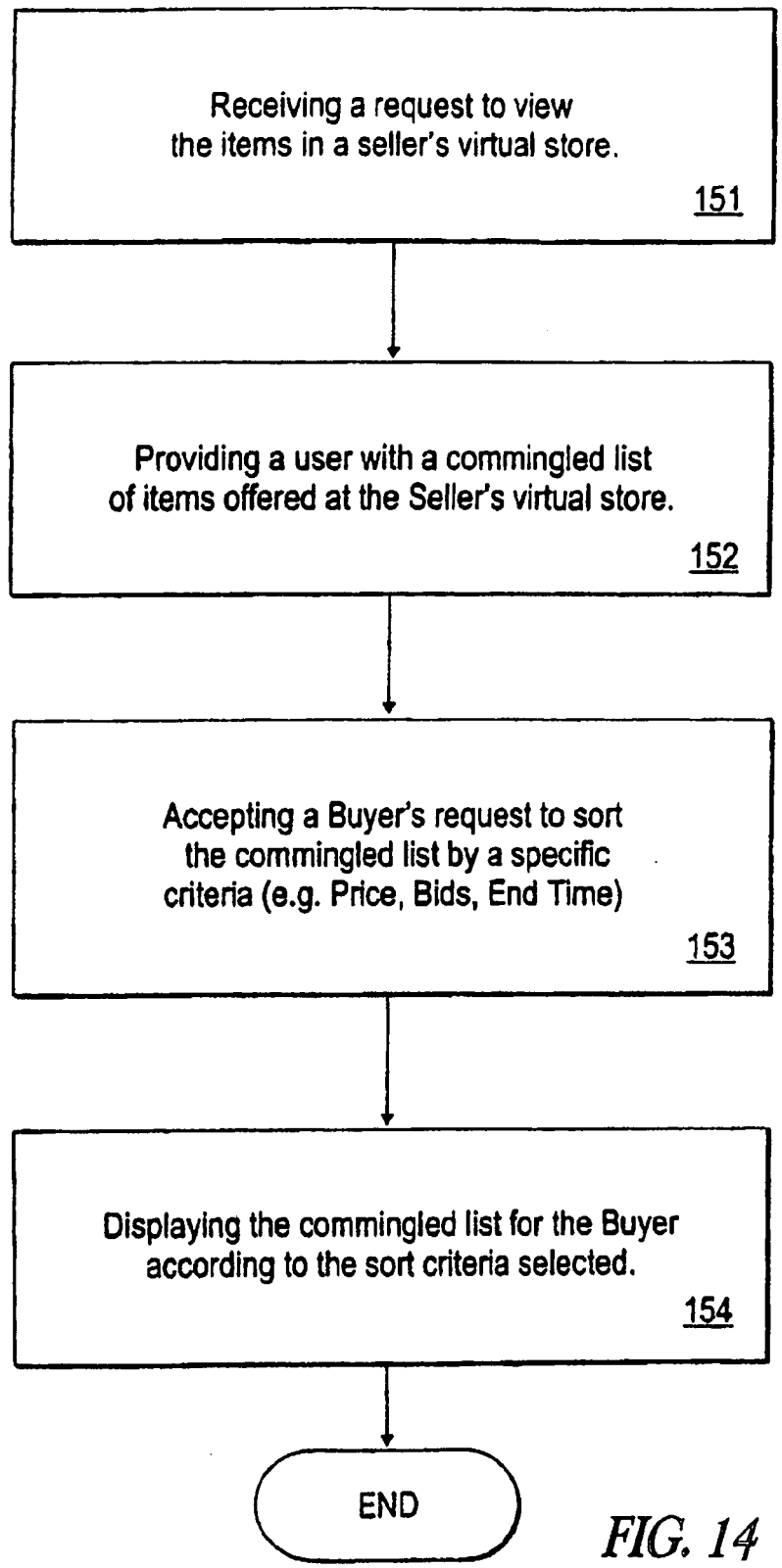
FIG. 14 is a flow chart illustrating a method according to an exemplary embodiment of the present invention, of displaying a commingled of items offered at a Seller's virtual store, where the items are sorted according to a specific criteria (e.g. price).

FIG. 14 is a flow chart illustrating a method 150, according to an exemplary embodiment of the present invention, of displaying a commingled of items offered at a Seller's virtual store, where the items are sorted according to a specific criteria (e.g. price). The method 150 shall be described within the context of the exemplary user interface 900 shown in FIG. 9 as generated by the method 70 described above with reference to FIG. 5.

At block 151, the network based auction facility 10 receives a buyer's request to view the items in a seller's virtual store. At block 152, as described above by the method 70 with reference to FIG. 5, a commingled list of items 903 offered by the Seller's virtual store is provided at the Buyer's graphical user interface.

In an exemplary embodiment of the invention, at block 153, a Buyer may select a sort criteria (e. g. Price, Bids, End Time). At block 154, the commingled list will be displayed according to the sort criteria selected.

The above-described embodiment of the present invention assumes a central network-based auction facility 10 that maintains a central database 23 of users and offerings. It will however be appreciated that the present invention may also be applied to a peer-to-peer trading system implemented as applications executing on distributed computer systems that communicate via a network. In this case, the methods 70, 110, 120, and 150 discussed above with reference to 4, 8, 9, and 12 may be executed, for example, by an application program residing on a computer system of a seller.

Figure 15:
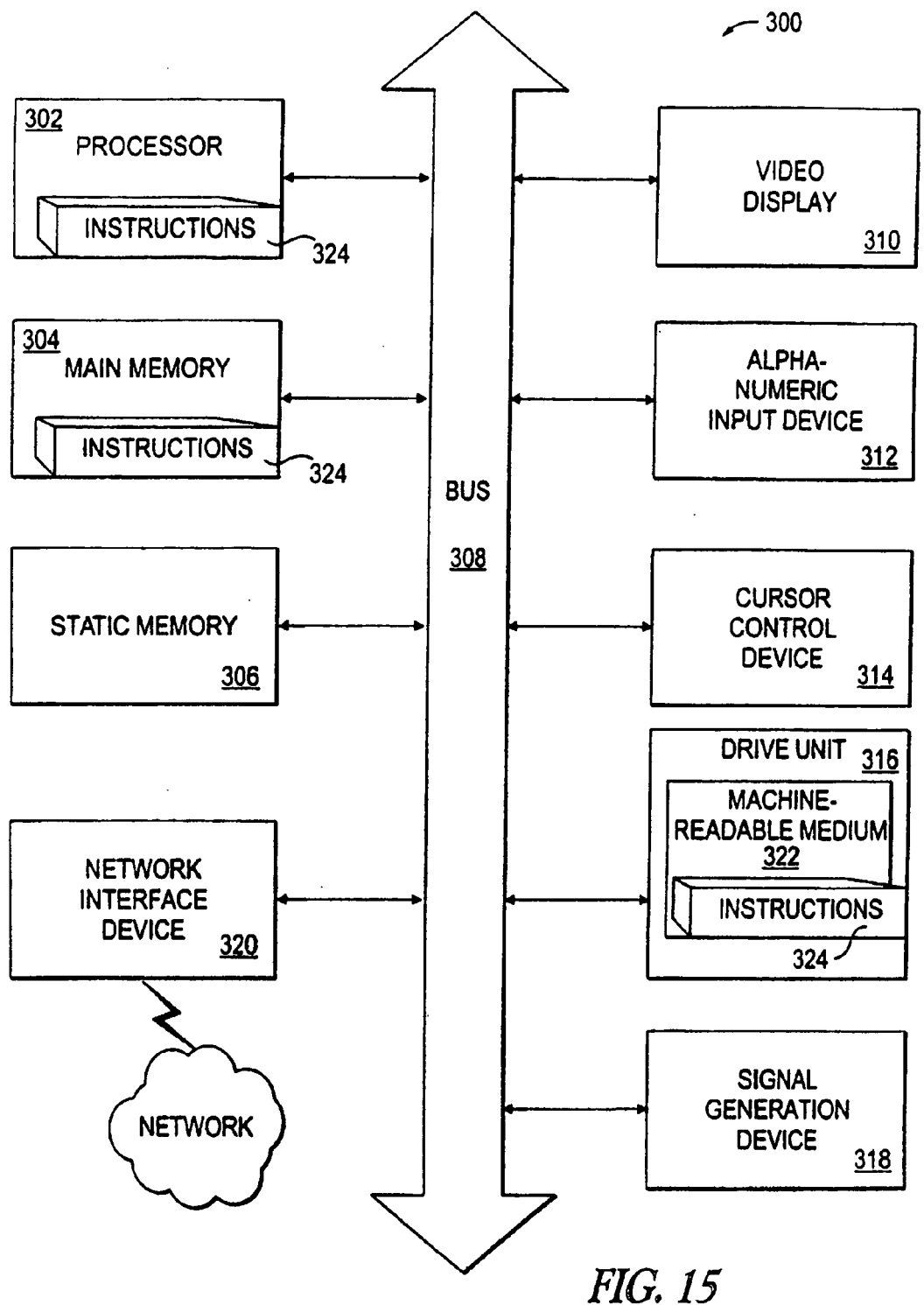
FIG. 15 is a diagrammatic representation of a machine in the exemplary for the computer system within which a set of instructions for causing machine to perform any one of the methodologies of the invention may be executed.

Further, while the exemplary embodiment of the present invention has been discussed within the context of the network-based auction facility 10, the teachings of the present invention may be implemented within any network-based transaction system whereby transactions for the purchase and/or sale of an offering are concluded between two or more parties Software FIG. 15 shows a diagrammatic representation of a machine in the exemplary form of a computer system 300 within which a set of instructions, for causing the machine to perform any one of the methodologies discussed above may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e. g., a liquid crystal display (LCD) or a cathode ray tube (CRT)). The computer system 300 also includes an alpha-numeric input device 312 (e. g., a keyboard), a cursor control device 314 (e. g., a mouse), a disk drive unit 316, a signal generation device 318 (e. g., a speaker) and a network interface device 320.

The disk drive unit 316 includes a machine-readable medium 322 on which is stored a set of instructions (i.e., software) 324 embodying any one, or all, of the methodologies described above. The software 324 is also shown to reside, completely or at least partially, within the main memory 304 AND/OR within the processor 302. The software 324 may further be transmitted or received via the network interface device 320. For the purposes of this specification, the term "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

Thus, a method and system automatically to remind parties to a network-based transaction to comply with obligations established under a transaction agreement have been described. Although the present invention has been described with reference to specific exemplary embodiments, various modifications and changes may be made to these embodiments without departing from the broader spirit and scope of the invention. Accordingly, the specification and drawings are to be regarded in an illustrative rather than a restrictive sense.

What is claimed is:

1. A system comprising:
a network-based transaction facility including a plurality of front-end servers coupled to at least one network and to at least one back-end server, the plurality of front-end servers operable to facilitate communications between the network-based transaction facility and at least one client machine coupled to the network;
the network-based transaction facility operable to receive a request from a client machine to view items that are offered for sale on the network-based transaction facility and to communicate the request through the plurality of front-end servers to the at least one back-end server,
the at least one back-end server operable to search a database maintained by the network-based transaction facility, wherein the network-based transaction facility includes a database engine server coupled to at least one engine server database including a user table, the engine server database includes an items table that is linked to the user table and that includes a sellers items table and a bidders items table, wherein the items table includes a number of fields for each of a plurality of records that describe an item offered for sale via the network-based transaction facility, wherein at least one of the number of fields includes a sale type field operable to record a type of item that indicates a price-setting process by which a price for the item relevant to the record associated with the item being offered for sale is established, the database including at least one item offered for sale using an auction-type price setting process and at least one item offered for sale using a fixed price setting process;
the at least one back-end server operable to generate a commingled list of items offered for sale based on the request and on data stored within the database, wherein the commingled list includes items being offered for sale by any combination of an auction-type price setting process and a fixed price setting process; and
wherein the commingled list includes items being offered for sale by any combination of an auction-type price setting process and a fixed price setting process, and wherein if the request includes a specified transaction type, the at least one back-end server is operable to filter the comingled list to include only items offered for sale that have a type of item in the sale type field for the item offered for sale that matches the specified transaction type,
the at least one back-end server operable to communicate the commingled list through the plurality of front-end servers and over the network to the client machine.

2. The system of claim 1, wherein the plurality of front-end servers includes:
a page server operable to deliver web pages;
a picture server operable to dynamically deliver images to be displayed within web pages;
a listing server operable to facilitate category-based browsing of one or more items being offered for sale on the network-based transaction facility; and
a search server operable to receive search requests and facilitate keyword-based browsing of the one or more items being offered for sale on the network-based transaction facility.

3. The system of claim 1, wherein the at least one back-end server includes a search index server coupled to a search index server database.

4. The system of claim 1, wherein the at least one back-end server includes a credit card database server coupled to a credit card server database.

5. The system of claim 1, wherein the user table includes a respective record for each of a plurality of users of the network-based transaction facility.

6. The system of claim 5, wherein each of the plurality of users is a seller, a buyer, or both a seller and a buyer within the network-based transaction facility.

7. The system of claim 5, wherein each link between the items table and the user table indicates whether a user listed in the user table is a seller or a buyer with respect to one or more items for which records are included within the items table.

8. The system of claim 1, wherein the plurality of front-end serves act in combination as a display engine to facilitate the display of the at least one client machine of the commingled list of items generated by the network-based transaction facility.

9. A method comprising:
storing in a database maintained by the network-based transaction facility a listing of a plurality of items being offered for sale by a seller in a virtual store of the seller, wherein the items offered for sale are associated with a plurality of transaction types including an auction price-setting process and a fixed price-setting process, wherein the database includes a database engine server coupled to at least one engine server database including an items table, the items table defining a plurality of fields for each of the plurality of item being offered for sale, including a sale type field for each given item being offered for sale, wherein the sale type field records the price setting process for each of the plurality of items being offered for sale;
accepting at the network-based transaction facility a first request from a client machine accessing the transaction facility over a network, the first request to retrieve a specific item offered for sale by the seller that meets search criteria provided with the first request;
searching the database to determine if any items being offered for sale by the seller meet the search criteria;
generating a commingled list of located items offered for sale by the seller that meet the search criteria;
communicating across the network to the client machine the generated commingled list for display at the client machine;
accepting at the network-based transaction facility a second request from the client machine, the second request to sort the commingled list by specific criteria, wherein the specific criteria includes a specified transaction type of the plurality of transaction types;
using the sales type field from the items table, looking up in the items table the specified transaction type to determine if any of the items from the commingled list meet the requirements for the specified transaction type by comparing the specified transaction type to the sales type field in the items table;
generating a sorted list, the sorted list sorted to include only items offered for sale by the seller that meet the specified transaction type included in the second request; and
communicating across the network to the client machine the sorted list for display at the client machine.

10. The method of claim 9, wherein
- accepting the second search request includes the specified transaction type requesting to view only those items in the commingled list that are an auction items;
- generating an auction items list of items from the commingled list, the auction items list including only auction items; and
- displaying the auctions items list of items at the client machine.

11. The method of claim 9, wherein the plurality of transaction types include items for sale using a hybrid auction/fixed price-setting.

12. The method of claim 9, wherein
- accepting the second search includes a request from the buyer to view only those items from the commingled list that include a fixed price purchase option;
- generate a fixed price list of items from the commingled list, the fixed price list including items that have a fixed price purchase option; and
- display the fixed price list of items at the client machine.

13. The method of claim 9, further including
- storing in the database a stores portion including a listing of stores available for buyer selection;
- providing an interface at the client machine which allow the buyer to indicate a selection from the listing of stores; and
- receiving from the client machine a selection including an indication of a selection from the listing of stores.

14. The method of claim 13, wherein the selection includes a selection from a listing of stores provided according to a category; and
- providing an interface displaying a list of seller's virtual stores based on the selected category.

15. The method of claim 14, further including:
- receiving from the client machine a selection indicating a chosen one of seller's virtual stores from the listing of stores.

16. The method of claim 15 wherein after receiving a selection indicating the chosen one of the seller's virtual stores, performing a look-up operation on an items table within the database to obtain a title and details including a transaction type associated with each of one or more items available in the chosen one of the seller's virtual stores.

17. A non-transitory computer readable medium storing a sequence of instructions that, when executed by a machine, cause the machine to perform a method comprising:
- storing in a database maintained by the network-based transaction facility a listing of a plurality of items being offered for sale by a seller in a virtual store of the seller, wherein the items offered for sale are associated with a plurality of transaction types including an auction price-setting process and a fixed price-setting process, wherein the database includes a database engine server coupled to at least one engine server database including an items table, the items table defining a plurality of fields for each of the plurality of item being offered for sale, including a sale type field for each given item being offered for sale, wherein the sale type field records the price setting process for each of the plurality of item being offered for sale;
- accepting at the network-based transaction facility a first request from a client machine accessing the transaction facility over a network, the first request to retrieve a specific item offered for sale by the seller that meets search criteria provided with the first request;
- searching the database to determine if any items being offered for sale by the seller meet the search criteria;
- generating a commingled list of located items offered for sale by the seller that meet the search criteria;
- communicating across the network to the client machine the generated commingled list for display at the client machine;
- accepting at the network-based transaction facility a second request from the client machine, the second request to sort the commingled list by specific criteria, wherein the specific criteria includes a specified transaction type of the plurality of transaction types;
- using the sales type field from the items table, looking up in the items table the specified transaction type to determine if any of the items from the commingled list meet the requirements for the specified transaction type by comparing the specified transaction type to the sales type field in the items table;
- generating a sorted list, the sorted list sorted to include only items offered for sale by the seller that meet the specified transaction type included in the second request; and
- communicating across the network to the client machine the sorted list for display at the client machine.

18. The system of claim 1, wherein the database includes items offered for sale in at least one seller's virtual store that offers for sale both at least one item for sale using an auction-type price setting process and at least one item offered for sale using a fixed price setting process.

* * * * *

UNITED STATES PATENT AND TRADEMARK OFFICE
CERTIFICATE OF CORRECTION

| | |
|---|---|
| PATENT NO. | : 8,428,996 B2 |
| APPLICATION NO. | : 10/023583 |
| DATED | : April 23, 2013 |
| INVENTOR(S) | : Grove et al. |

Page 1 of 1

It is certified that error appears in the above-identified patent and that said Letters Patent is hereby corrected as shown below:

In the Claims

In column 10, line 19, in Claim 8, delete "serves" and insert --server--, therefor In column 11, line 21, in Claim 13, delete "including" and insert --including:--, therefor Signed and Sealed this
Twenty-fifth Day of November, 2014

Michelle K. Lee
*Deputy Director of the United States Patent and Trademark Office*